US010067990B1

(12) United States Patent
Boothman et al.

(10) Patent No.: US 10,067,990 B1
(45) Date of Patent: Sep. 4, 2018

(54) SYSTEM, METHOD, AND COMPUTER PROGRAM FOR IDENTIFYING SIGNIFICANT ATTRIBUTES OF RECORDS

(71) Applicant: Amdocs Development Limited, Limassol (CY)

(72) Inventors: Catherine Boothman, Dublin (IE); Peter John Cogan, Dublin (IE); Paul Andrew Ferguson, Dublin (IE); Tomasz Rutowski, Gdansk (PL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 309 days.

(21) Appl. No.: 15/060,520

(22) Filed: Mar. 3, 2016

(51) Int. Cl.
 *G06F 17/30* (2006.01)
 *G06N 99/00* (2010.01)
 *G06Q 30/02* (2012.01)
(52) U.S. Cl.
 CPC ..... *G06F 17/30554* (2013.01); *G06N 99/005* (2013.01); *G06Q 30/0201* (2013.01)
(58) Field of Classification Search
 CPC ........... G06F 17/30554; G06N 99/005; G06Q 30/0201
 USPC ...................................................... 700/722
 See application file for complete search history.

(56) References Cited

U.S. PATENT DOCUMENTS

| 6,014,647 A * | 1/2000 | Nizzari ............ G06Q 20/10 705/39 |
| 6,996,551 B2 | 2/2006 | Hellerstein et al. |
| 7,672,865 B2 | 3/2010 | Kumar et al. |
| 7,720,759 B2 | 5/2010 | Fine et al. |
| 7,730,003 B2 | 6/2010 | Pinto et al. |
| 7,865,383 B2 | 1/2011 | Tafoya |
| 7,917,383 B2 | 3/2011 | Maga et al. |
| 8,103,531 B2 | 1/2012 | Wollan et al. |
| 8,140,362 B2 * | 3/2012 | Deshpande ............ G06N 5/025 705/7.11 |
| 8,204,884 B2 * | 6/2012 | Freedman .............. G06Q 30/06 379/265.06 |
| 8,311,863 B1 | 11/2012 | Kemp |
| 8,335,692 B2 | 12/2012 | Sheth et al. |
| 8,504,408 B2 | 8/2013 | Banthia et al. |

(Continued)

FOREIGN PATENT DOCUMENTS

| WO | 2011079200 A2 | 6/2011 |
| WO | 2013043672 A1 | 3/2013 |

OTHER PUBLICATIONS

Hamuro, Yukinobu, et al., "A Machine Learning Algorithm for Analyzing String Patterns Helps to Discover Simple and Interpretable Business Rules from Purchase History", Progress in Discovery Science 2001, LNAI 2281, Springer-Verlag, Berlin, Germany, © 2002, pp. 565-575.*

"IBM Journey Analytics," IBM Commerce, Dec. 2015, pp. 1-4, retrieved from https://www.ibm.com/blogs/commerce/articles/tag/ibm-journey-analytics/.

(Continued)

*Primary Examiner* — Robert Stevens
(74) *Attorney, Agent, or Firm* — Zilka Kotab, P.C.

(57) ABSTRACT

A system, method, and computer program product are provided for identifying significant attributes of records (e.g. journeys, etc.). A plurality of records are stored, including a plurality of events with a plurality of attributes. Further, the attributes of the events are processed, utilizing machine learning. To this end, at least one of the attributes are identified as being significant, based on the processing. Such identified at least one attribute may then be displayed, etc.

4 Claims, 8 Drawing Sheets

(56) References Cited

U.S. PATENT DOCUMENTS

| | | | |
|---|---|---|---|
| 8,543,690 | B1 | 9/2013 | Zeitoun et al. |
| 8,560,359 | B2 | 10/2013 | Salle et al. |
| 8,600,804 | B2 | 12/2013 | Ramchandani et al. |
| 8,976,955 | B2 * | 3/2015 | Liberman Ben-Ami ..................... H04M 3/5191 379/265.01 |
| 9,098,810 | B1 | 8/2015 | Sengupta et al. |
| 2005/0091156 | A1 * | 4/2005 | Hailwood ............ G06Q 20/102 705/40 |
| 2008/0040364 | A1 | 2/2008 | Li |
| 2009/0018996 | A1 | 1/2009 | Hunt et al. |
| 2011/0082712 | A1 | 4/2011 | Eberhardt, III et al. |
| 2011/0179067 | A1 * | 7/2011 | Dalvi ................... G06Q 30/02 707/769 |
| 2012/0158485 | A1 | 6/2012 | Ogawa |
| 2013/0080362 | A1 | 3/2013 | Chang et al. |
| 2013/0244744 | A1 | 9/2013 | Fonss et al. |
| 2013/0282430 | A1 | 10/2013 | Kannan et al. |
| 2013/0317886 | A1 | 11/2013 | Kiran et al. |
| 2014/0052503 | A1 | 2/2014 | Zaloom |
| 2014/0156681 | A1 * | 6/2014 | Lee ................. G06F 17/30699 707/754 |
| 2014/0207561 | A1 | 7/2014 | Dandekar et al. |
| 2014/0222538 | A1 | 8/2014 | Merrifield, Jr. et al. |
| 2014/0229164 | A1 | 8/2014 | Martens et al. |
| 2015/0128263 | A1 | 5/2015 | Raugas et al. |
| 2015/0161508 | A1 * | 6/2015 | Martinez .............. G06N 99/005 706/20 |
| 2015/0193699 | A1 | 7/2015 | Kil et al. |
| 2015/0244580 | A1 | 8/2015 | Saavedra |
| 2017/0024640 | A1 * | 1/2017 | Deng ..................... G06N 3/08 |
| 2017/0245106 | A1 * | 8/2017 | Connelly ............ H04W 4/021 |

OTHER PUBLICATIONS

Rittman, S., "Visualizing the customer journey through analytics," May 1, 2015, pp. 1-2, retrieved http://blogs.sas.com/content/hls/2015/05/01/visualizing-the-customer-journey-through-analytics/.

"Customer Engagement Analytics," NICE Systems, pp. 1-5, retrieved on Jan. 25, 2016 from http://www.nice.com/engage/customer-engagement-analytics.

Rabiner, L. R., "A tutorial on hidden Markov models and selected applications in speech recognition," Proceedings of the IEEE, vol. 77, No. 2, Feb. 1989, pp. 257-286.

Heineman, G. T. et al., "Algorithms in a Nutshell; A Desktop Quick Reference" First Edition, 2009, pp. 1-336.

Buttle, F., "Customer Relationship Management: Concepts and Technologies," Second Edition, Butterworth-Heinemann, 2009, pp. 1-500.

Brugnoli, G., "Connecting the Dots of User Experience—The design of an interaction system: a tool to analyze and design the user experience," Journal of Information Architecture, vol. 1, Issue 1, 2009, pp. 6-15.

Richardson, A., "Innovation X: Why a Company's Toughest Problems are it's Greatest Advantage," Jossey-Bass, Wiley, 2010, ebook, pp. 1-264.

Mangiaracina, R. et al., "The eCommerce Customer Journey: A Model to Assess and Compare the User Experience of the eCommerce Websites," Journal of Internet Banking and Commerce, vol. 14, No. 3, Dec. 2009, pp. 1-11.

Lavalle, S. et al., "Big Data, Analytics and the Path From Insights to Value," MIT Sloan Management Review, vol. 52, No. 2, Winter 2011, pp. 21-31.

Heineman, G. T. et al., "Algorithms in a Nutshell; A Desktop Quick Reference" First Edition, 2009, Chapter 7, pp. 172-225.

* cited by examiner

SYSTEM, METHOD, AND COMPUTER PROGRAM FOR IDENTIFYING SIGNIFICANT ATTRIBUTES OF RECORDS

FIELD OF THE INVENTION

The present invention relates to customer data processing systems, and more particularly to processing customer data for analysis purposes.

BACKGROUND

A variety of customer data processing systems exist for tracking information on interactions a customer has with a business. During use, such customer data processing systems process the aforementioned information for a variety of analysis purposes. For example, some systems generate maps reflecting the aforementioned interactions based on various criteria. To date, however, such customer data processing systems lack an ability to identify attributes associated with record-related events that are significant in a variety of ways (e.g. significant indicators of positive or negative customer experiences, etc.).

There is thus a need for addressing these and/or other issues associated with the prior art.

SUMMARY

A system, method, and computer program product are provided for identifying significant attributes of records (e.g. journeys, etc.). A plurality of records are stored, including a plurality of events with a plurality of attributes. Further, the attributes of the events are processed, utilizing machine learning. To this end, at least one of the attributes are identified as being significant, based on the processing. Such identified at least one attribute may then be displayed, etc.

DETAILED DESCRIPTION

Figure 1A:
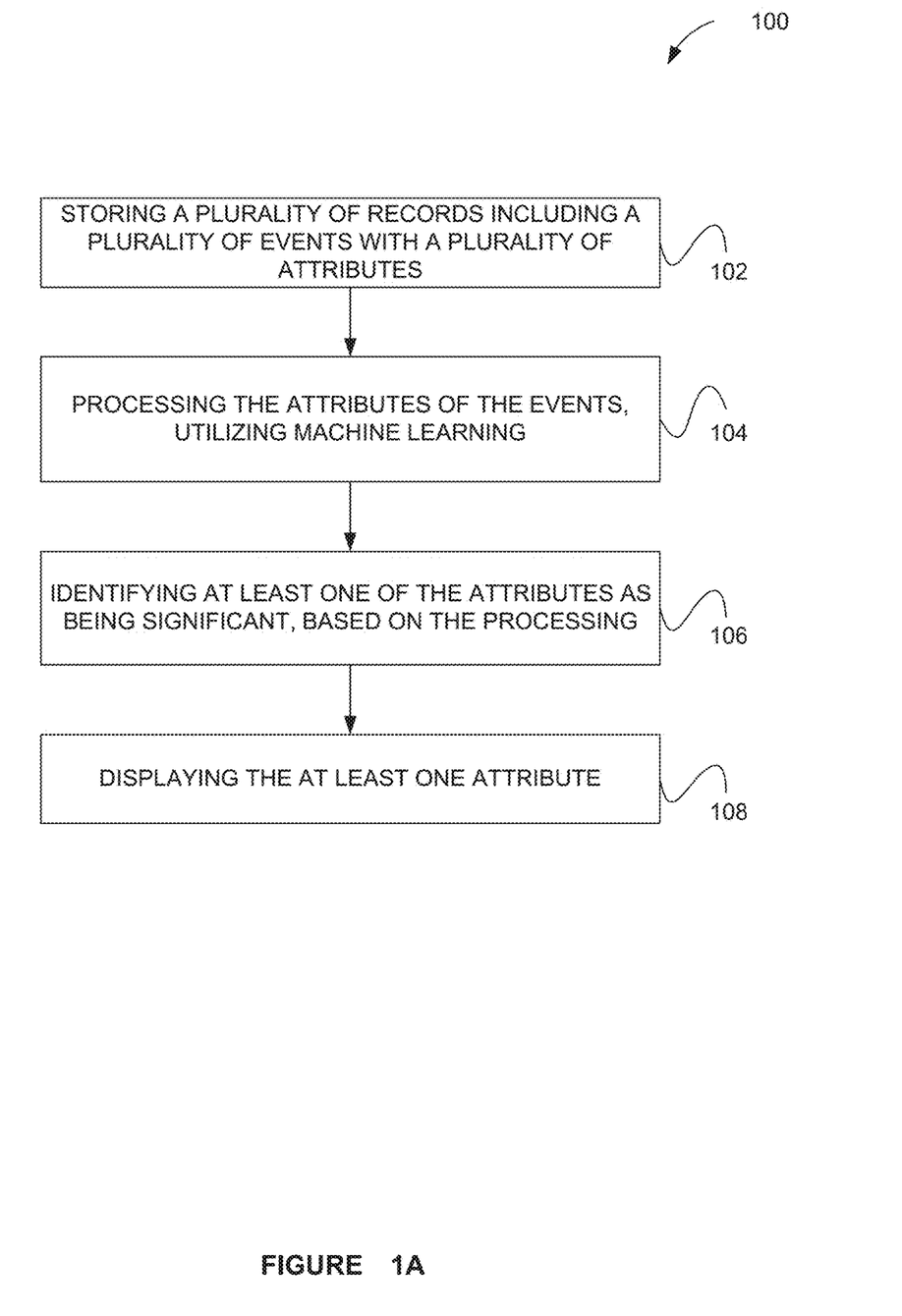
FIG. 1A illustrates a method for identifying significant attributes of records (e.g. journeys, etc.), in accordance with one embodiment.

FIG. 1A illustrates a method for identifying significant attributes of records (e.g. journeys, etc.), in accordance with one embodiment. As indicated in operation 102, a plurality of records are stored. The records collectively include a plurality of events. In one possible embodiment, the events may be of different event types. Further, as yet another option, such events relate to a plurality of different customers. Still yet, in other possible embodiments, the events may be collected from a plurality of different sources.

In the context of the present description, a record may refer to any one or more data structures that is capable of including one or more events. Also in the context of the present description, an event refers to any information relating to an event involving one or more of the aforementioned customers. Just by way of example, in one exemplary embodiment, each event may involve an off-line and/or on-line interaction with one or more of the aforementioned customers. Still yet, the types of the events may differ in any desired manner. For instance, in one possible embodiment, one or more events may relate to a call or message (or any other communication, for that matter) received from and/or sent to a particular customer, one or more events may relate to a purchase made by a particular customer, one or more events may relate to a return made by a particular customer, etc.

In one optional embodiment to be described in the context of subsequent figures, the aforementioned record may include a "journey record," or more simply just a "journey", of a customer. In the context of the present description, a journey record, or a journey, refers to any sequence of events over time in connection with at least one customer. Still yet, in the context of the optional embodiment where the records include journeys, one or more events thereof may possibly each include a "sub-journey record," or more simply just a "sub-journey."

As mentioned earlier, the foregoing events may involve a variety of different interactions (e.g. off-line, on-line, call, etc.) with one or more customers. Similarly, in varying embodiments, the attributes may exhibit the same type of diversity. For example, the attributes may relate to a call, an on-line interaction, and/or an interaction in a brick and mortar store. To this end, the attributes may include an intent, a duration, a customer type, and/or an outcome. More examples of such diversity will be set forth later in greater detail during the description of subsequent embodiments. As will also be described later in greater detail, the attributes may, in some embodiments, also exhibit a certain level of commonality. For instance, the attributes of the events may be of a same number for each of the records, be of a same type for each of the records, and/or exhibit any other aspect of commonality for any desired purpose (e.g. to facilitate processing, etc.).

As indicated in operation 104, the attributes of the events are processed, utilizing machine learning. In the context of the present description, machine learning may refer to any type of artificial intelligence that provides one or more computers with an ability to learn. Further, the aforementioned processing may include any processing that at least partially enables identification of at least one of the attributes as being significant.

In some optional embodiments, an indication of a subset of the records may be received from a user (e.g. via an input device, etc.), where such indication identifies which of the attributes of the events are to be processed. In other embodiments, the attributes of the events may even be transformed into a matrix, which may facilitate the aforementioned processing. Further, for reasons that will soon become apparent, a field may be associated with the matrix, for indicating a journey outcome associated therewith. In various embodiments, such outcome may refer to a successful or unsuccessful outcome. In other embodiments, the outcome may involve a churn event, payment of a bill, etc. Thus, in the context of the present description, the aforementioned outcome may refer to anything that results from a particular journey.

To this end, as set forth in operation 106, at least one of the attributes is identified as being significant, based on the processing of operation 104. In the context of the present description, the foregoing significance may relate to any aspect of at least one attribute that distinguishes the same from the remaining attributes. For example, in one embodiment, such significance may relate to a degree in which a journey outcome depends on the at least one attribute.

In one optional embodiment, the at least one attribute identified as being significant, may be analyzed. For example, such analysis may determine how the at least one attribute is significant. In one particular embodiment, the analysis may even determine how a journey outcome depends on the at least one attribute.

With continuing reference to FIG. 1A, the at least one attribute is displayed. See operation 108. In various other embodiments, the at least one attribute may also be used for further leveraging the significance of the at least one attribute, by adjusting future customer journeys. For instance, in one embodiment, at least one business rule may be changed, based on the at least one attribute that is identified.

It should also be noted that the method 100 may be implemented utilizing various hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

As mentioned earlier, a journey of a customer may, in various embodiments, relate to experiences of a customer through a set of interactions with systems (e.g. on-line, off-line, etc.). Such customer journey potentially holds valuable information related to actions that customers take, and different paths that are often taken to accomplish the same goals.

Various embodiments involve an analysis of multiple customer journeys that contain a variety of different interactions that lead to the accomplishment of a similar goal. By way of such analysis, such embodiments are capable of identifying patterns that lead to various outcomes for the customer. Further, by identifying these patterns, insight may be gained into the optimal paths to achieve a desired goal. Armed with such information, customers may be routed to such optimal paths, or, in cases where this is not possible, problematic areas may be identified and subsequently improved.

In additional optional embodiments, information may be leveraged that extends beyond a list of sequential interaction points (that customers have experienced). For example, events along a journey may be enriched with attributes that add context to each of the aforementioned events. Although such attributes may provide more information from which to differentiate between what leads to success and failure, the process of identifying which attributes are more significant potentially poses challenges in terms of posing a higher dimensional problem. As will be discussed later, machine learning techniques may be used to identify attributes that are significant, in terms of leading to various outcomes for the customer. Further, such information may be harnessed to make predictions about future customer journeys. To this end, various embodiments may be used to leverage the predictive power of machine learning to determine likely outcomes of future customer journeys, thereby allowing intervention in such journeys where, from a high level, a successful outcome is uncertain.

Before significant attributes can be identified, journey records may be created for each customer. Such journey creation may, in various embodiments, involves extraction of data relating to a plurality of events (e.g. each of their possible touch points, etc.) associated with the customer. Each of such events may capture an interaction between the customer and a business. More information regarding such creation of journey records will be set forth during reference to the various optional embodiments described during reference to FIGS. 2-5 and may further be found with reference to U.S. application Ser. No. 15/060,511, filed Mar. 3, 2016, entitled "EVENT PROCESSING SYSTEM, METHOD, AND COMPUTER PROGRAM," which is incorporated herein by reference for all purposes.

In various embodiments, an order of events in a particular journey may be determined by a time-stamp of the event, with a first event (e.g. call event, etc.) in the journey being the earliest event to occur. The fact that a customer experienced such events at a particular time is not all that is known in relation to each of these events. Each of such events potentially holds a large amount of attributes relating to details of such events.

Figure 1B:
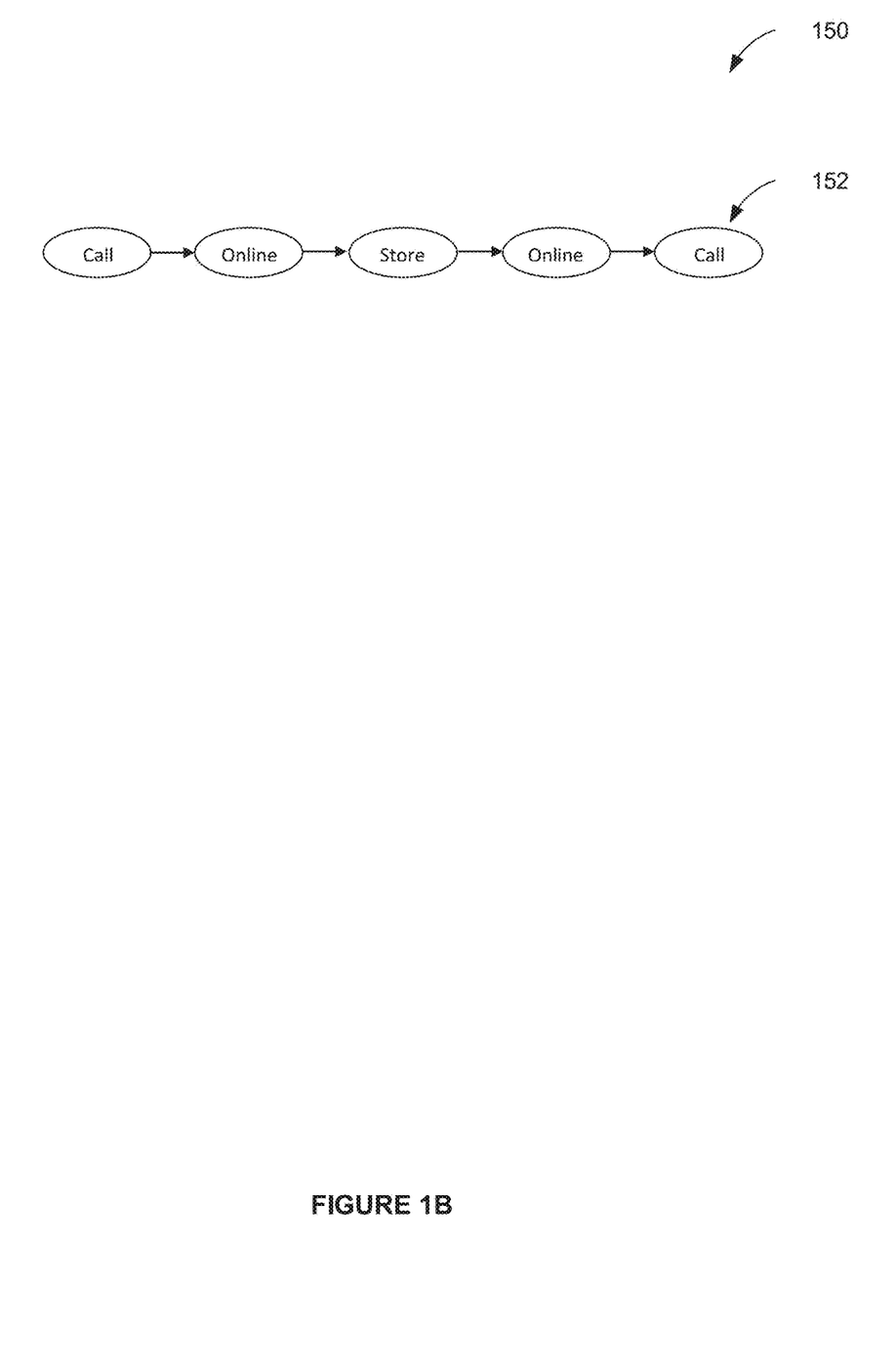
FIG. 1B illustrates an exemplary journey involving multiple events, in accordance with one embodiment.

FIG. 1B illustrates an exemplary journey 150 involving multiple events 152, in accordance with one embodiment. Each of the events 152 may have a number of associated attributes. Table 1 illustrates exemplary attributes that may be associated with each of the events 152.

TABLE 1

| Call |
| --- |
| Intent |
| Duration of call |
| Call center that handled the call |
| Type of customer |
| Did a transfer take place during the call |
| Etc. |

| Online |
| --- |
| Intents |
| Most frequent intent |
| Duration |
| Number of mouse clicks |
| Checkout (purchase anything) |
| Etc. |

| Store |
| --- |
| Store ID |
| Intent |
| Number of items purchased in a transaction |
| Etc. |

An individual customer many have many journeys with the foregoing types of events, including multiple instances of the same journey. Thus, in one embodiment, it may be ascertained that the attributes collected for an event are for a particular specific journey. As an option, such correlation may even be tracked by each journey having its own unique identifier. To this end, each uniquely identified journey may have a uniquely associated set of events which, in turn, may have a uniquely associated set of attributes, such that the uniquely identified journey is uniquely associated with such set of attributes.

By this design, the fact that each of the customer journeys contains such detailed attributes (for each event) may be utilized in differentiating between customers. In one embodiment, this may be accomplished by analyzing, via the events and/or attributes, the behavior of customers that lead to different outcomes (e.g. success, failure, etc.).

Through such analysis of different customer journeys and events thereof (e.g. sub-journeys, etc.), it may be possible to discover patterns, based only on the sequence of events that are likely to lead to specific outcomes (e.g. success, failure, etc.). For instance, customers with a first sequence of events (e.g. A, B, C, D, etc.) may be 80% successful, while those with a second sequence of events (e.g. A, B, E, D, etc.) may be only successful 40% of the time. Thus, analysis of such information may reveal that the different paths that customer took was the main differentiating factor in leading to the different likelihood for success.

In some embodiments, processing of the events and/or attributes may be expanded to analyze the information related to the customers who experienced the first sequence of events (e.g. A, B, C, D, etc.) so as to discover the factors that result in 80% being successful and the other 20% being unsuccessful. To accomplish this, the attributes associated with the corresponding events may be further analyzed. By virtue of the complexity of the analysis of the attributes to discover journey-specific patterns, a machine learning process may be applied which is capable of dealing with such higher dimensional problem.

In order to set the stage for the incorporation of machine learning in subsequent analysis, some feature engineering may be applied to the data. In some embodiments, such feature engineering may treat the analysis as a means to a solution of a classification problem where, on a high level, only similar (or substantially similar) attributes are compared, so that the reasons for any difference in outcome may be seen to lie in the values of the attributes themselves (as opposed to differences in attributes, attribute types, attribute quantities, etc.).

To this end, some embodiments may bin any continuous numerical attributes and further transform categorical variables appropriately. For instance, categories of attributes that have an associated order may be converted to an ordered number sequence. In the context of a very specific example, "very bad", "bad", "ok", "good" and "very good" may have an order where the second is better than the first, and so on. Thus, such values may, in some embodiments, be replaced with values from 1 to 5. Further, for categorical variables with no implied order (e.g. colors such as "blue", "yellow" and "orange", etc.), such embodiments may create three new binary variables that are true or false depending on what color is associated with a particular customer. It should be noted that the foregoing are merely examples of the type of feature engineering that may be performed on the data, in some optional embodiments.

At this point, a defined matrix of attributes may be provided for events in a journey. Still yet, a field may be associated with the matrix, to indicate an outcome of the journey. For example, such field may indicate whether the journey was successful or not, based on certain criteria. By virtue of such known outcome labels being applied by the system doing the analysis, the present embodiment may incorporate supervised machine learning that makes it possible to identify the event attributes which are most influential in a prediction model for determining if a journey is likely to result in one outcome rather than another.

With the significant attributes having been identified, analysis may continue to determine how a value of a particular attribute will have an impact on the successful outcome of a journey. For example, if the busyness of a shop (in a journey like the example described above) turns out to be an important influencing factor, it may be helpful to know in what way such busyness impacts any outcome. On one hand, it may be determined that the busier the shop is, the more negative the experience is for the customer. On the other hand, it may be determined that there are more staff during busier periods, so that wait times are actually shorter and, in reality, busier periods are a more positive experience for the customer. By providing such relationship information, assumptions may be avoided in determining how future customer journeys should be guided. Of course, this may be accomplished in a variety of ways. For example, a plot of attributes and target variables may be one way that could be used to show how the significant attributes impact journey outcomes.

To this end, in various embodiments, customer journeys may be built out of events, a set of attributes may be attached to each event in a journey, and machine learning techniques may be applied to these journeys. While the foregoing examples have been focused on customer interactions, it should be noted that the records, events, and corresponding attributes may be associated with network cloud service orchestration, self-optimizing network solutions, and/or absolutely any other desired environment. Further, the purpose of such processing may vary per the desires of the user and may include, for example, analysis involving churn prediction, life time value prediction, fraud prediction, next best offer, etc.

Figure 2:
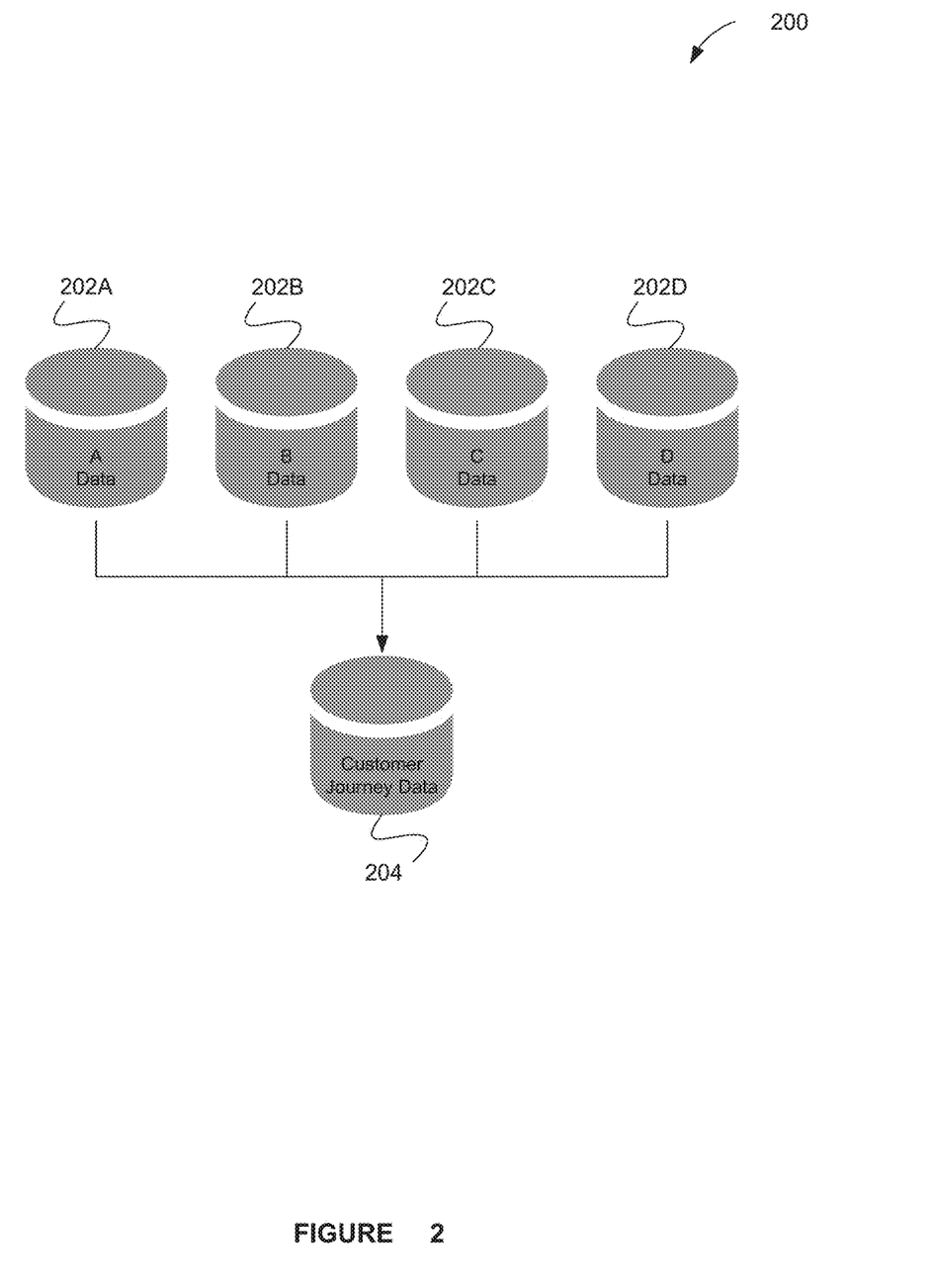
FIG. 2 illustrates a data collection system, in accordance with one embodiment.

More exemplary information will now be set forth regarding the creation of journey records and the events associated therewith, in the context of various optional embodiments. FIG. 2 illustrates a data collection system 200, in accordance with one embodiment. As an option, the system 200 may be implemented in the context of the details of FIG. 1 and/or any subsequent figure(s). Of course, however, the system 200 may be implemented in the context of any desired environment. Further, the aforementioned definitions may equally apply to the description below.

In the context of the present embodiment illustrated in FIG. 2, a "journey" may relate to experiences of a customer through a set of interactions with a business. Such business may include any type of business including, but not limited to a service provider (e.g. network service provider, etc.), a provider of products, etc. As will become apparent, the customer journey may potentially hold valuable information related to different actions and paths that customers take to accomplish various goals.

It should be noted that a full customer journey potentially reflects the customer's interactions across a potentially extended period of time, during which the customer may have many different goals which they were attempting to accomplish. However, if one is interested in analyzing the customer's behavior in relation to accomplishing a specific goal, such larger segments of their full journey (which may be related to one or more different goals) may potentially be unrelated.

To this end, the present embodiment provides for the identification of more relevant sub-journeys. Such targeted sub-journeys may, in turn, provide a view of the actions taken in order to achieve a particular goal. Further, details within each sub-journey may provide the context necessary to understand the actions taken by a particular user to accomplish (or attempt to accomplish) a specific goal.

As will soon become apparent, extracting a large number of the foregoing sub-journeys for different users provides information helpful in differentiating between different user actions and making useful comparisons across users (and/or set(s) of users) in relation to the actions that are taken. In one possible embodiment, this sub-journey creation may be applied in analyzing the behavior of customers in relation to calling a call center. It may further allow for the comparison of factors that lead up to successful outcomes versus those that do not, across multiple users.

In terms of creating a single journey for each customer, data may be extracted relating to each of their events (e.g. touch points, etc.). Each of these events, in the present embodiment, may possibly capture an interaction between the customer and the business. Just by way of example, the events may involve a customer purchasing a product, a customer phoning a call center to resolve an issue, and/or any other interaction, for that matter.

In one embodiment, the different events may be stored across a number of sources (e.g. different database 202A, 202B, 202C, 202D) in a variety of different formats. As shown, data from the different database 202A, 202B, 202C, 202D may, in one embodiment, relate to different event types A, B, C, D. Thus, the creation of a single journey for each customer may initially involve extracting required information in a unified format for each customer into a single chronologically ordered list of events in at least one customer journey database 204.

Figure 3:
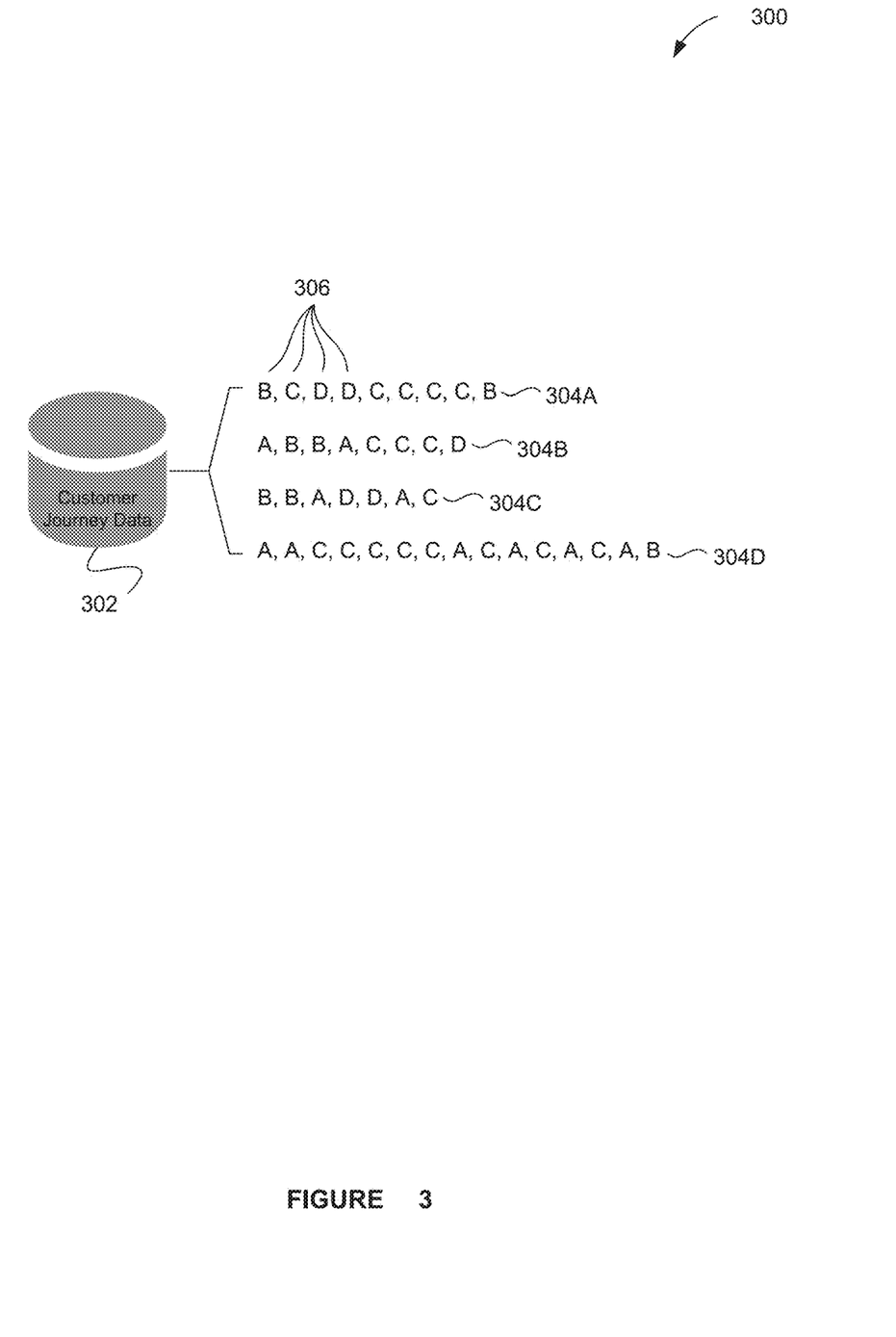
FIG. 3 illustrates a customer journey database system, in accordance with one embodiment.

FIG. 3 illustrates a customer journey database system 300, in accordance with one embodiment. As an option, the system 300 may be implemented in the context of the details of any previous and/or subsequent figure(s). For example, the system 300 may be implemented in the context of the customer journey database 204 of FIG. 2. Of course, however, the system 300 may be implemented in the context of any desired environment. Further, the aforementioned definitions may equally apply to the description below.

As shown in FIG. 3, a customer journey database 302 includes a plurality of journey records 304A, 304B, 304C, 304D each representing a customer journey (in chronological order, in the present embodiment). Further, each of the journey records 304A, 304B, 304C, 304D is illustrated to include a series of events 306 giving details of any interactions the customer had with various systems along the way. While each of the illustrated events 306 (A, B, C, etc.) represents a user interaction in the present embodiment, it should be noted that the information is not limited in this regard. For example, the events 306 may depend on the associated source and there may be potentially numerous different attributes which may be included that provide additional details relating to what precisely occurred during the corresponding event.

Figure 4:
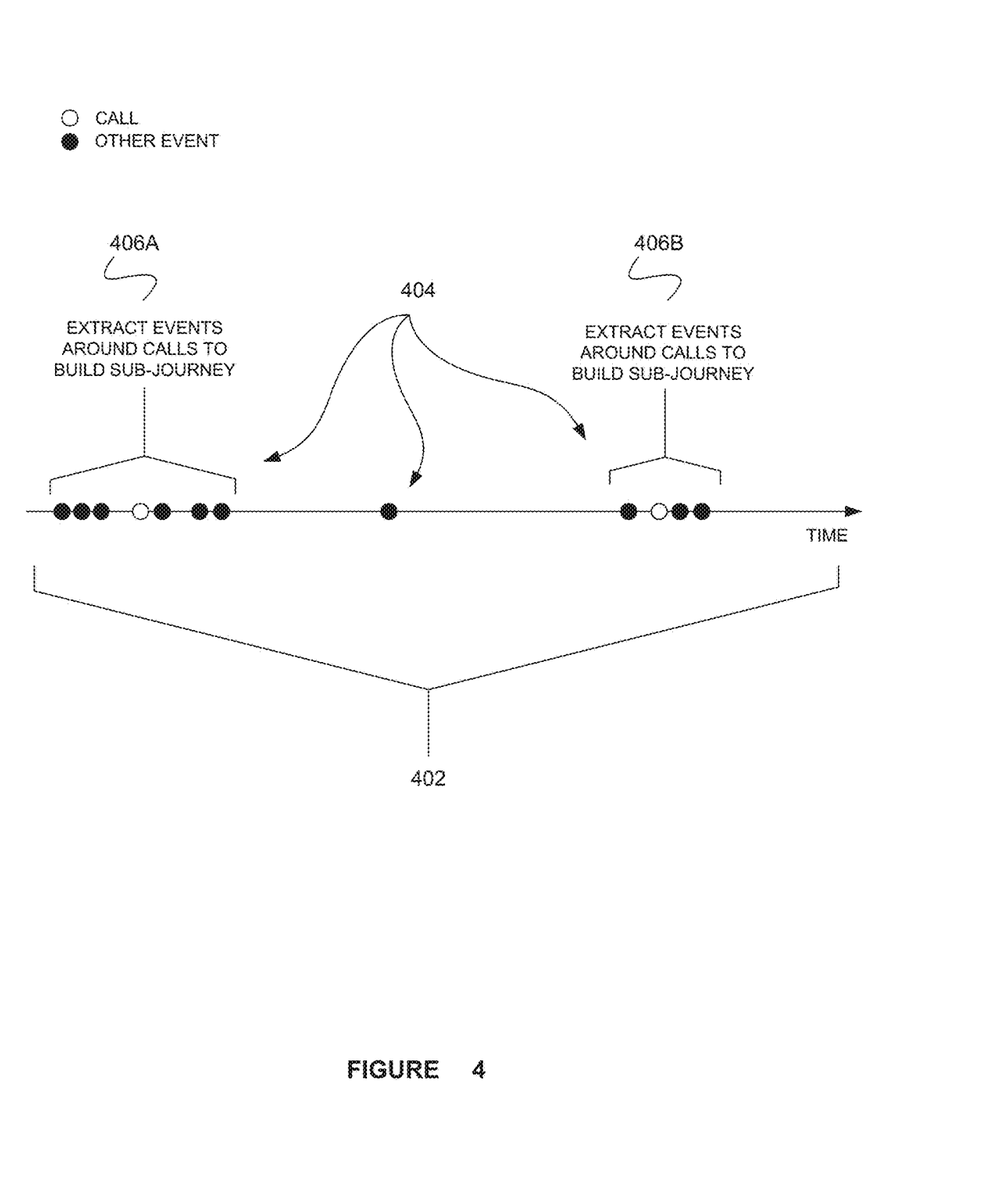
FIG. 4 illustrates a method for creating a targeted sub-journey, in accordance with one embodiment.

FIG. 4 illustrates a method 400 for creating a targeted sub-journey, in accordance with one embodiment. As an option, the method 400 may be implemented in the context of the details of any previous and/or subsequent figure(s). Of course, however, the method 400 may be implemented in the context of any desired environment. Further, the aforementioned definitions may equally apply to the description below.

As shown, a customer journey 402 is illustrated that includes an entire set of events 404 in which a user has been involved, across a potentially very long period of time, during which the customer may have had many different goals which they were attempting to accomplish. The method 400 serves to divide each entire journey 402 into sub-journeys 406A, 406B for creating "aspect"-centric sub-journeys, which provide a view of the actions relevant to the particular aspect. In the present embodiment, the aforementioned aspect may be a particular event (e.g. customer call, etc.) and/or a goal that the customer was attempting to accomplish.

For example, if a customer calls a call center and then calls again in one years' time, it cannot be assumed that the two calls are linked and, in fact, to get a better measure for the customer's experience in interacting with the call center, it may be potentially advantageous (in some embodiments) to look at each call in isolation. For example, isolating the relevant sub-journey 406A, 406B may allow one to look at the context for the call and then examine the customer experience afterwards to see if the issue was resolved. In this example, the user's goal may be to resolve an issue and the event-centric sub-journey that is created may be built around the relevant call.

As shown in FIG. 4, two distinct sub-journeys 406A, 406B are shown to be created, each of which captures the event of interest (e.g. the call, etc.), as well as other events that surround such event. By examining these sub-journeys 406A, 406B individually, factors may be more easily determined that lead to the respective call. It may also be possible to investigate if (and how quickly) the issue was resolved.

In one possible embodiment, the creation of the sub-journeys 406A, 406B may firstly require that an event of interest be specified (e.g. a phone call, etc.). It is also possible that an event of interest may be a sequence of events, or an event where something specific occurred. For instance, such specific occurrence may involve a customer having made a call but their call being transferred, etc. Once this event of interest is defined, a set of other "relevant" events may be extracted. In this sense, the sub-journey may be "targeted" towards the particular event. Depending on the event of interest, relevant events may occur before and/or after such event of interest.

In another possible embodiment, both this, as well as the manner in which relevant events are determined, may be configured. For instance, this may be accomplished based on time. Specifically, the method 400 may only include events for N number of days before and/or after a call. This potentially provides a set of sub-journeys related to a particular event of interest (or sequence of events), including the contextual events that occurred around such event. Each of the sub-journeys 406A, 406B may also be enriched with information relating to a customer profile. For example, various information (e.g. age, demographics, location, etc.) may be provided which may, in turn, account for certain behaviors.

To this end, various embodiments are operable to (but may not necessarily) provide a much more concise set of user interactions that can be used to determine how each customer acts around a particular point of interest. For instance, if a customer calls a call center, a precise sub-journey may be extracted showing the events that lead to such call, including potential issues like an incorrect bill being issued, and/or problems with a device they are using. Any additional events following the call may show an effect that the call had on the customer (e.g. if they had to call again to resolve the same issue, etc.).

Figure 5:
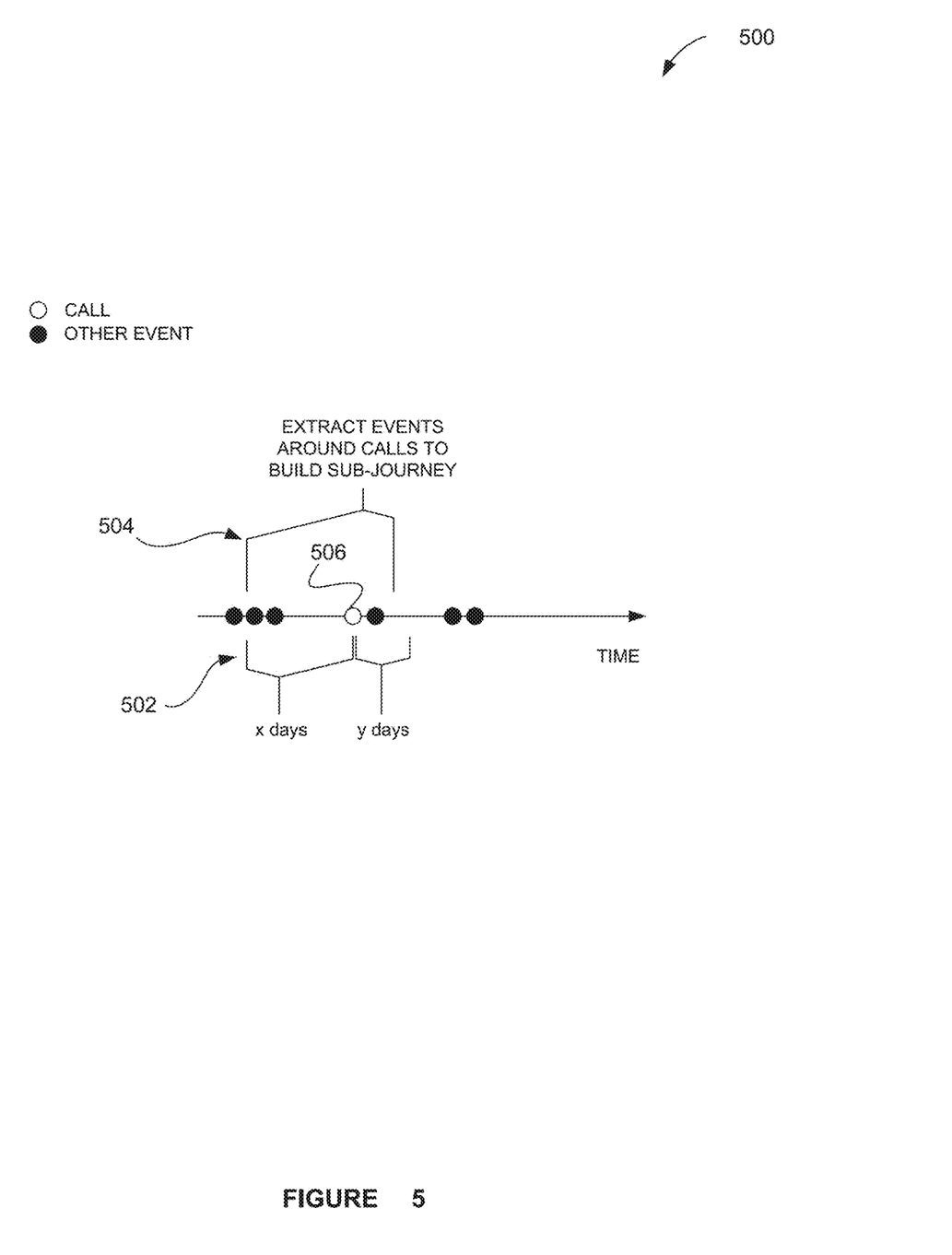
FIG. 5 illustrates a method for creating a targeted sub-journey, in accordance with one embodiment.

FIG. 5 illustrates a method 500 for creating a targeted sub-journey, in accordance with one embodiment. As an option, the method 500 may be implemented in the context of the details of any previous and/or subsequent figure(s). Of course, however, the method 500 may be implemented in the context of any desired environment. Further, the aforementioned definitions may equally apply to the description below.

In various embodiments, relevant events within each sub-journey may be determined in a number of different ways. In one possible embodiment, the specific way may be particular to a type of analysis that is required, based on the extracted sub-journeys. As illustrated in FIG. 5, for instance, certain relevant events 502 within a particular sub-journey 504 may be determined based on their proximity to an event of interest 506. Such proximity may, for instance, be determined as a function of time, or by falling within a specified number of events, etc. In one embodiment, it may also be determined that the relevant events are only of one particular type (and others are possibly not considered).

Alternatively or additionally, a starting point of the targeted sub-journey 504 may be signaled by a known event. For example, such known event may involve logging onto a website. By this design, known events may be designed to delimit start and end points of the sub-journey 504. Essentially, such relevance criteria may be determined by a number of factors, based on a need of those carrying out the end analysis, and the relevance criteria may even be specified as a set of rules to be followed in creating the desired sub-journey 504.

To this end, the extracted sub-journey 504 may be used to examine user behavior relating to a particular event and/or action of interest. One possible benefit of such approach of generating the concise sub-journey 504 may be to allow comparisons to be made across a number of customers. By the sub-journey 504 being created in a manner that is related to an event of interest, more meaningful comparisons are enabled across customers. Further, by examining sub-journeys of a large number of customers around the same event of interest, one can potentially gain insight into common factors that lead to success and/or failure.

Additional information will now be set forth, in the context of additional optional embodiments, regarding various techniques for further reducing noise in the targeted sub-journeys. For instance, in one embodiment, a journey/sub-journey database (e.g. see database 204/302 of FIGS. 2/3, etc.) may be utilized to generate two metrics, namely a total number of sub-journeys, and a number of unique sub-journeys. The number of unique sub-journeys may be useful, since customers with a sub-journey in common may have had a similar experience and thus represent a common use case. For example, a database of sub-journeys shown in Table 2 may be considered, where the letters represent events.

TABLE 2

A, B, C
A, D, C
A, B, C
E, F, G,
A, D, C

The database of Table 2 is shown to have a total of five (5) sub-journeys, and three (3) unique sub-journeys. With this, a metric R may be defined to be a ratio of the number of unique sub-journeys to the total number of sub-journeys. See Equation #1.

$$R = \frac{\text{Number of Unique Sub Journeys}}{\text{Number of Sub Journeys}} \quad \text{Equation \#1}$$

where $R$ is in the range $0 < R \leq 1$

In the aforementioned example illustrated in Table 1, R is 0.6. In one embodiment, R may be designed to be as low as possible. For instance, if every sub-journey is unique, then R is 1.

In the end, each unique sub-journey effectively represents a unique business case to be addressed. If there are too many unique sub-journeys, one may have too many business cases, and each business case has a very low number of instances (thus diluting and/or invalidating their value). For example, the set of sub-journeys of Table 3 may be considered, where the underlined events emphasize unique transitions.

TABLE 3

Journey 1 - A, X̲, B, C, D, E, F
Journey 2 - A, B, Y̲, C, D, X, E, F
Journey 3 - A, D̲, B, C, D, E, F
Journey 4 - A, B, Z̲, C, D, Y, E, F
Journey 5 - A, B, C, D, L̲, E, F In this case, the ratio R is 1 as all sub-journeys are unique. In such case, it may be desired to reduce a noisiness associated with the sub-journeys, by, for example, removing rare event transitions. As exemplified in Table 2, it is quite likely that certain sub-journeys may have very unique sequences inside the sub-journey. This means that there may be existing commonalities at the beginning and/or the end of a sub-journey, but somewhere in the middle, there may be an event that creates an unnecessary unique sub-journey. A technique will now be described which may be used, in some embodiments, in order to identify such events.

In one embodiment, the aforementioned technique may involve the creation of a transition matrix which counts of a number of times a particular event j follows another event i. Thereafter, such counts in the transition matrix may be converted into probabilities. In one embodiment, this may be accomplished by dividing each cell by the sum of all transitions. Still yet, this may be iterated over each sub-journey. To this end, if the event transition in the sub-journey has a probability in the matrix below some threshold T1, such event (e.g. the second event in the transition, etc.) may be deleted.

An example of the foregoing technique will now be described in the context of a journey database illustrated by Table 4.

TABLE 4

Figure 6:
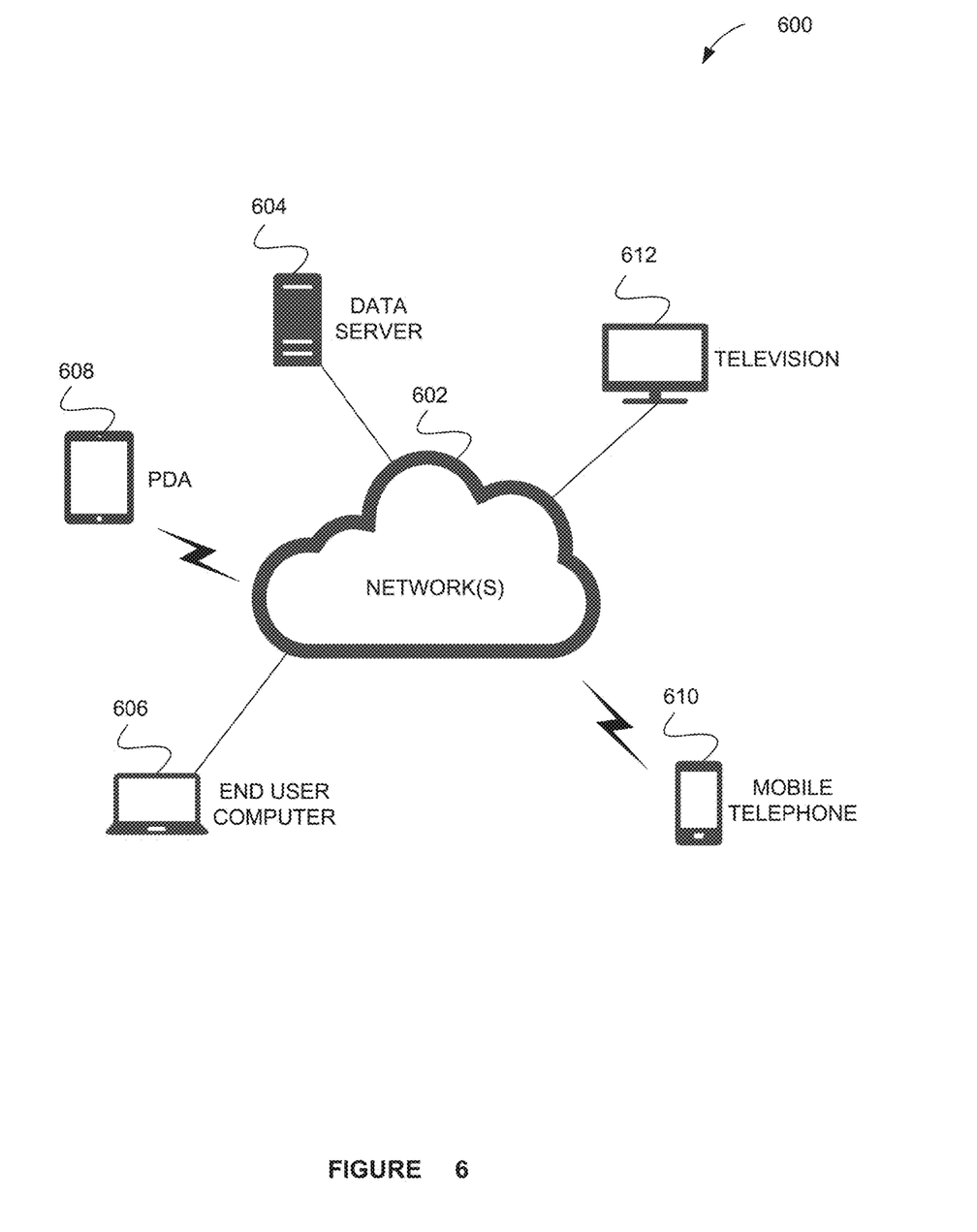
FIG. 6 illustrates a network architecture, in accordance with one possible embodiment.

Journey 1 - A, B, C, D, E, F
Journey 2 - A, B, C, D, X, E, F
Journey 3 - A, B, C, D, E, F
Journey 4 - A, B, C, D, Y, E, F
Journey 5 - A, B, C, D, E, F FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
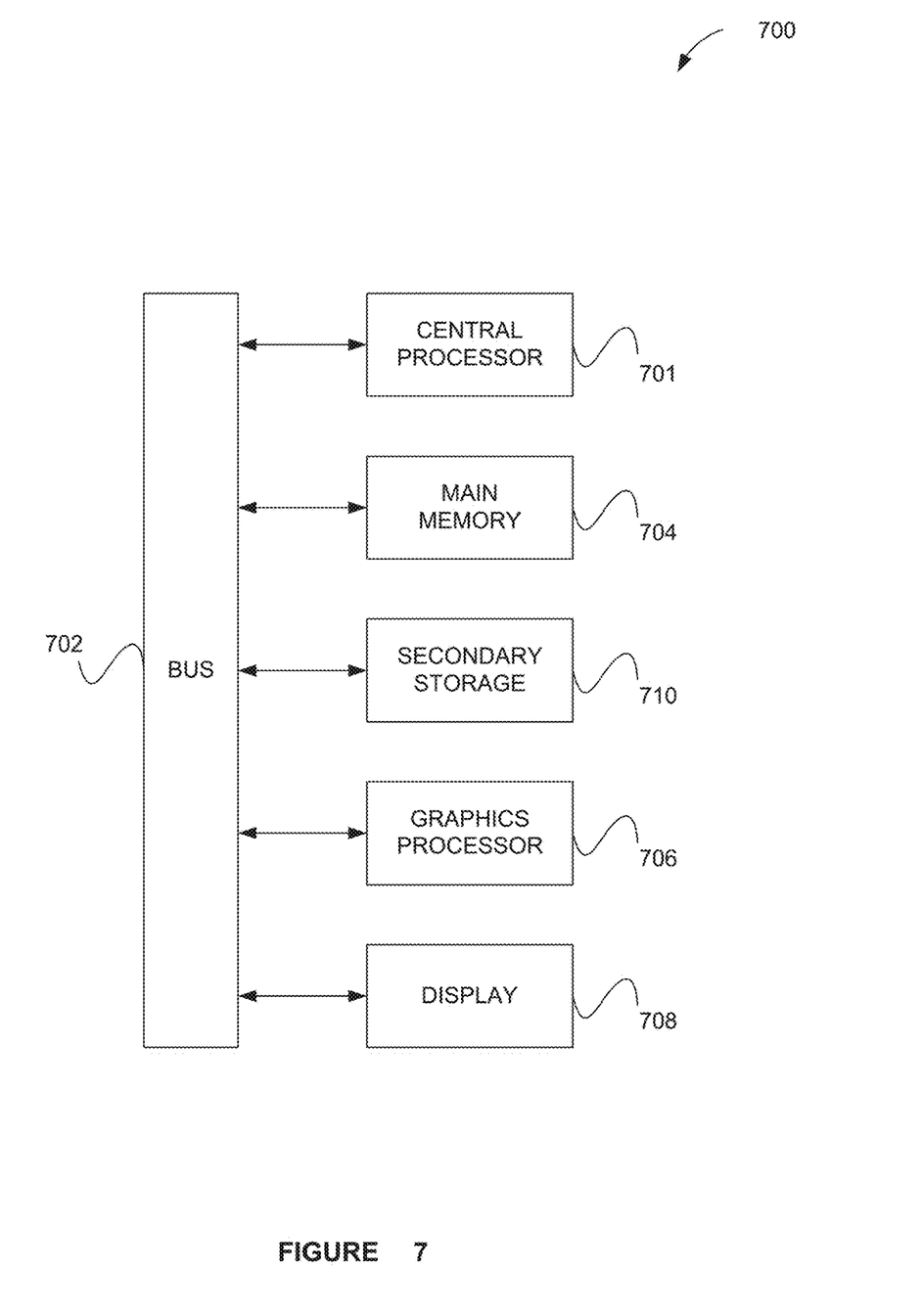
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising computer code for:

storing, in a database, a plurality of records, each of the records including information relating to a sequence of events occurring over time and involving interactions between a customer and on-line and off-line systems, and each of the records having a plurality of attributes relating to the events and including:
an intent,
a duration,
a customer type, and
and an outcome resulting from the sequence of events, the outcome selected from a plurality of outcomes that include a success and a failure;
analyzing the records to identify a pattern in the sequences of events that more often than not lead to a certain outcome of the plurality of outcomes;
processing, utilizing at least one processor, the attributes of the records having the identified pattern, utilizing machine learning, to:
identify which attributes of the records lead to the certain outcome of the plurality of outcomes, and
identify values of the identified attributes that lead to the certain outcome of the plurality of outcomes; and
adjusting at least one business rule to enable a subsequent different sequence of events for at least one customer, based on the identified values of the identified attributes that lead to the certain outcome of the plurality of outcomes.

2. The computer program product of claim 1, wherein the success involves payment of a bill and the failure involves a churn event.

3. A method, comprising:
storing, in a database, a plurality of records, each of the records including information relating to a sequence of events occurring over time and involving interactions between a customer and on-line and off-line systems, and each of the records having a plurality of attributes relating to the events and including:
an intent,
a duration,
a customer type, and
and an outcome resulting from the sequence of events, the outcome selected from a plurality of outcomes that include a success and a failure;
analyzing the records to identify a pattern in the sequences of events that more often than not lead to a certain outcome of the plurality of outcomes;
processing, utilizing at least one processor, the attributes of the records having the identified pattern, utilizing machine learning, to:
identify which attributes of the records lead to the certain outcome of the plurality of outcomes, and
identify values of the identified attributes that lead to the certain outcome of the plurality of outcomes; and
adjusting at least one business rule to enable a subsequent different sequence of events for at least one customer, based on the identified values of the identified attributes that lead to the certain outcome of the plurality of outcomes.

4. A system, comprising:
one or more hardware processors for:
storing, in a database, a plurality of records, each of the records including information relating to a sequence of events occurring over time and involving interactions between a customer and on-line and off-line systems, and each of the records having a plurality of attributes relating to the events and including:
an intent,
a duration,
a customer type, and
and an outcome resulting from the sequence of events, the outcome selected from a plurality of outcomes that include a success and a failure;
analyzing the records to identify a pattern in the sequences of events that more often than not lead to a certain outcome of the plurality of outcomes;
processing the attributes of the records having the identified pattern, utilizing machine learning, to:
identify which attributes of the records lead to the certain outcome of the plurality of outcomes, and
identify values of the identified attributes that lead to the certain outcome of the plurality of outcomes; and
adjusting at least one business rule to enable a subsequent different sequence of events for at least one customer, based on the identified values of the identified attributes that lead to the certain outcome of the plurality of outcomes.

* * * * *